United States Patent [19]

Sullivan

[11] 4,303,734
[45] Dec. 1, 1981

[54] MULTIPLE LAYER EXTRUSION TOOLING HAVING A TIP ENABLING EXTRUSION OF ONE LAYER ONTO A SUBSTRATE AT A POINT OUTSIDE OF THE EXTRUSION HEAD

[75] Inventor: Roy E. Sullivan, Carrollton, Ga.

[73] Assignee: Southwire Company, Carrollton, Ga.

[21] Appl. No.: 100,769

[22] Filed: Dec. 6, 1979

[51] Int. Cl.³ .............................. B29F 3/04; B29F 3/10; H01B 7/18; H01B 13/24
[52] U.S. Cl. .............................. 428/368; 156/244.12; 156/500; 174/102 SC; 425/113; 425/133.1; 425/190; 425/191; 425/192 R; 425/381; 425/463; 425/467; 428/380; 428/383
[58] Field of Search ............ 425/463, 467, 113, 133.1, 425/190, 191, 192 R, 381; 156/500, 244.12; 174/102 SC; 428/368, 380, 383

[56] References Cited

U.S. PATENT DOCUMENTS

| | | | |
|---|---|---|---|
| 3,538,547 | 11/1970 | Drabb | 425/113 |
| 3,581,343 | 6/1971 | Henrikson et al. | 425/113 |
| 3,903,233 | 9/1975 | Dougherty | 425/113 |
| 3,947,172 | 3/1976 | Myers | 425/467 |
| 4,081,232 | 3/1978 | Pemberton et al. | 425/113 |
| 4,093,414 | 6/1978 | Swiatovy | 425/113 |
| 4,206,011 | 6/1980 | Kanotz et al. | 156/500 |

*Primary Examiner*—James C. Cannon
*Attorney, Agent, or Firm*—Stanley L. Tate; Herbert M. Hanegan; Robert Steven Linne

[57] ABSTRACT

Disclosed is an apparatus and method for extruding primary insulation and insulation shielding onto an advancing shielded conductor strand in one operation without causing inward protrusions of insulation shielding compound particles into the primary insulation comprising an extruder head with a starter tip, an anti-protrusion tip and a die.

19 Claims, 9 Drawing Figures

MULTIPLE LAYER EXTRUSION TOOLING HAVING A TIP ENABLING EXTRUSION OF ONE LAYER ONTO A SUBSTRATE AT A POINT OUTSIDE OF THE EXTRUSION HEAD

BACKGROUND OF THE INVENTION

The present invention relates generally to cablemaking, and specifically to an apparatus and method for the tandem extrusion in a common head of primary insulation and insulation shielding onto an advancing shielded conductor without causing inward protrusion of hard particles from insulation shield compound into the primary insulation.

Thermoplastic and cross-linked polyethylene insulated power cables rated 5 through 69 KV generally consist of a conductor surrounded by an extruded semiconducting shield material and extruded primary insulation which is in turn surrounded by an extruded semiconductive shield material. The insulation shielding may be either thermoplastic or thermosetting and is applied directly over the insulation. For cables rated 5 through 35 KV, the shielding must be removable without damaging the insulation and when removed must leave no conductive material on the insulation which cannot be readily removed. In order to economically produce such a cable, wire and cable manufacturers have attempted to develop a practical method of tandem extrusion in a common crosshead of at least the primary insulation material and the insulation shielding material, U.S. Pat. No. 4,081,232 illustrates extrusion tooling for such a method. The apparatus disclosed and claimed in U.S. Pat. No. 4,081,232 generally consists of an extruder die assembly for extruding a plurality of concentric layers of polymeric materials over an advancing core wire. The extruder die assembly comprises an outer die block means having a first passage therethrough with a first longitudinal axis and including a first internal engaging portion. The outer die block means of U.S. Pat. No. 4,081,232 includes an annular guiding shoulder formed with an inwardly directed first abutment surface, an intermediate passage portion concentric to the first axis and terminating in a first plane transverse to the first axis and a generally smooth decreasingly tapered surface extending from the abutment surface to the intermediate passage. The extruder die assembly further comprises a guiding die means having a second passage therethrough with its axis coincident with the first axis, first flange means which cooperates with the first internal engaging portion and having an aligning portion cooperating with the first abutment, a multiplicity of ports formed in the flange for permitting flow of a first coating material therethrough and a cylindrical tubing tip concentrically disposed within the intermediate passage for forming a first annular and concentric material passageway and terminating in the first plane. The guiding die means also includes a thin walled conical section interconnecting the tip and the first flange, a second internal engaging section formed internally of the first flange and a second generally annular guiding shoulder formed with an inwardly directed second abutment surface. An inner guiding means of the extruder die assembly defines a third passageway with its axis substantially coincident to the first axis and includes a third flange which has an external surface which engages the second internal engaging section and a multiplicity of spaced ports, a second alignment portion which functions in conjunction with the second abutment shoulder and a second tubing tip concentrically disposed within the first tip and terminating in the first plane for forming a second annular and concentric material passageway.

The shielding material applied by using such an apparatus is generally either a thermoplastic or cross-linkable polyethylene compound which is filled with a substantially high concentration of a conductive grade carbon black. Carbon black is a particulate form of generally elemental carbon which has many industrial uses. The particle size of electrically conductive grade carbon black of the type used to prepare semiconductive insulation shielding compounds ranges from about 0.04 to about 0.45 microns, however, carbon black particles have a tendency to agglomerate and therefore could form an agglomerate within the polymer matrix of a shielding compound many times larger than the individual particles and such agglomerates might even form hard protrusions which might project from the insulation surface of the insulation shield and into the primary insulation of a power cable of the type previously described. Such protrusions have generally extended up to 40 mils into the insulation and have usually lead to the formation of stress points within the insulation matrix and electrochemical and eventually premature failure of the power cable. The problem of hard particles of carbon black protruding from the insulation shield and piercing the primary insulation is especially acute when tandem extrusion in a common crosshead such as the apparatus disclosed in U.S. Pat. No. 4,081,232 is used to apply the insulation and insulation shielding to a power cable because both the insulation and insulation shielding are in the molten state when they are applied to the conductor and being similar polymers generally undergo some mingling at the insulation—insulation shielding interface thereby allowing hard particles to easily penetrate the soft insulation and cause the formation of such stress points. Evidence of this mingling process is easily seen when the insulation shielding is stripped from the insulation because conductive protrusions generally remain in the primary insulation.

An additional problem resulting from the tandem extrusion of insulation and insulation shielding in a common crosshead such as the apparatus of U.S. Pat. No. 4,081,232 is the poor stripability of the insulation shield applied to the insulation in this manner. The insulation shield material of 5 through 35 KV cable must be removable without damaging the insulation and when removed must leave no conductive material which cannot be readily removed. When insulation and insulation shielding are applied to an electrical power conductor using apparatus and methods of the type disclosed in U.S. Pat. No. 4,081,232 the insulation and insulation shielding come together in a molten state in a common extrusion plane, and being similar polymers the insulation and the insulation shield have a tendency to mingle and be bonded together at this interface thereby making it very difficult to strip the insulation shielding from the insulation in accordance with industry specifications.

Another problem associated with the production of insulated power cable rising apparatus similar to the apparatus of U.S. Pat. No. 4,081,232 is the fact that many times the conductor will be improperly centered with respect to the insulation or the insulation will be improperly centered with respect to the insulation shield and it is virtually impossible to properly center conductor, insulation and insulation shield from one common adjustment. If the cable is not properly centered, the insulation and insulation shield will not be concentric to the conductor and the cable will be useless.

SUMMARY OF THE INVENTION

The present invention solves the problems of insulation shielding compound particles protruding into the primary insulation, poor stripping characteristics of the insulation shield and difficulty of centering. This invention is an apparatus for and a method of extruding primary insulation and insulation shielding onto an advancing shielded conductor strand in one operation without causing inward protrusions of insulation shielding compound particles into the primary insulation by reducing the pressure at which the insulation shielding is applied to the insulation. The present invention comprises an extruder head with a starter tip, an antiprotrusion tip and a die.

As shielded conductor strand enters the first section of the present invention it is guided to a predetermined straight central path by the starter tip core which also prevents plastic melt from exiting at the rear of the crosshead. As the shielded conductor strand exits the starter tip, primary insulation is extruded onto the conductor by cooperation of the starter tip with the core of the antiprotrusion tip which also serves as a die for the primary insulation. The antiprotrusion tip cooperates with the die to pressure extrude insulation shielding onto the insulation after it exits the extruder. Insulation shielding application is delayed by the unique antiprotrusion tip which extends through and past the exit face of the die. In this manner, the approximately 4,500 pounds per square inch pressure needed to extrude the insulation shield compound is reduced to about 90 to 300 pounds per square inch for thermosetting insulated power cable, and is reduced to about one atmosphere for thermoplastic insulated power cable at the insulation shield application point. This reduction of pressure and the "ironing," or "smoothing" of the insulation side surface of the shield prevents carbon black particles from the shield from penetrating the insulation.

Thus it is a major object of the present invention to provide an apparatus for extruding primary insulation and insulation shielding onto an advancing shielded conductor strand in one operation without causing inward protrusions of insulation shielding compound particles into the primary insulation by significantly reducing extrusion pressure to an application pressure which will not pressure insulation shielding compound particles into the primary insulation.

It is still another object of the present invention to provide a method of and apparatus for the production of insulated power cable by tandem extrusion in a common head of both primary insulation and insulation shielding material in such a manner that the insulation shield may be removed from the insulation without damaging the insulations and without leaving conductive material on the insulation which cannot be removed.

It is yet another object of the present invention to provide appparatus for the tandem extrusion in a common crosshead of insulation and insulation shielding on a conuctor to form an insulated power cable where in the concentricity of the insulation to the conductor and the insulation shielding to the insulation may be independently adjusted.

It is still another object of this invention to provide a method and apparatus for smoothing or ironing the insulation side surface of the insulation shield to force undispersed particles back into the polymer matrix and thereby prevent penetration of the insulation by such particles.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with the accompanied drawings in which like parts are given like identification numerals and wherein:

DESCRIPTION OF THE PREFERRED EMBODIMENT

Figure 1:
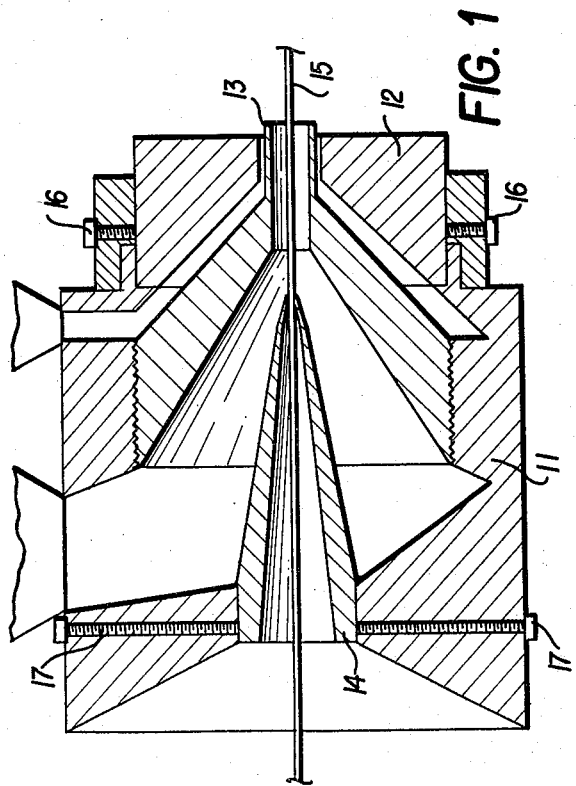
FIG. 1 is a cross-sectional view of the preferred embodiment of the present invention.

As FIG. 1 illustrates, the preferred embodiment of the present invention has four main parts; the extruder head body (11), the die (12), the antiprotrusion tip (13) and the starter tip (14).

Figure 2:
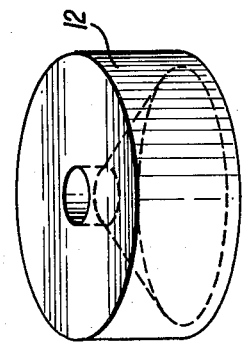
FIG. 2 is a perspective elevation of the die of the preferred embodiment.

FIG. 2 is an elevation of the die (12). The die (12) is cylindrical with an aperture concentric along its longitudinal axis and expanding from a circumference approximately the size of the finished product to be produced by the present invention on one end to a circumference almost as large as that of the die (12) on the other end, thus forming a funnel-shaped inner surface.

Figure 3:
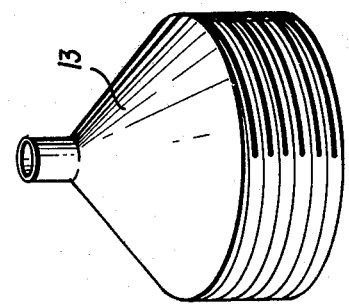
FIG. 3 is a perspective elevation of the antiprotrusion tip of the preferred embodiment.

FIG. 3 illustrates the most important part of the present invention, the antiprotrusion tip (13) which is somewhat funnel shaped. Its inner surface is similar to that of the die (12) in that it defines a central aperture concentric along the longitudinal axis of the antiprotrusion tip (13) expanding from approximately the size of the circumference of insulated cable to be extruded by the present invention on one end to a circumference almost as large as that of the antiprotrusion tip (13) on the other end. At the end containing the smallest aperture circumference there is a tubular extension of sufficient length to pass through the aperture of the die (12) and extend beyond the face of the die (12). From the position where the tubular extension contacts the main body of the antiprotrusion tip (13), the outer surface slants outward in conical fashion to an intermediate location near the largest circumference of the antiprotrusion tip (13). The remaining portion adjacent thereto has the largest circumference and is cylindrical with a screw threaded outer surface.

Figure 4:
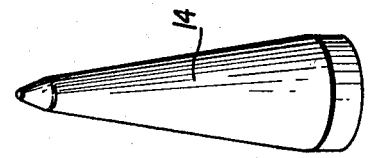
FIG. 4 is a perspective elevation of the starter tip of the preferred embodiment.

As FIG. 4 illustrates, the starter tip (14) is basically a cone expanding from a concentric aperture about the size of shielded conductor strand to be processed by the present invention on one end to a convenient circumference on the other end.

Figure 5:
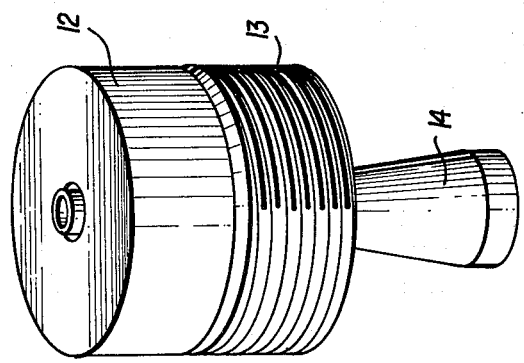
FIG. 5 is a perspective elevation of the die, the antiprotrusion tip and the starter tip as they cooperate in the preferred embodiment of the present invention.

Cooperation of the three parts (12, 13, and 14) is shown by FIG. 5. The starter tip (14) extends into the large opening of the antiprotrusion tip (13) and the small end of the antiprotrusion tip (13) extends into the large opening of the die (12) and through its small opening. All three (12, 13 and 14) are concentric to the longitudinal axis of the straight elongated conductor strand path.

Figure 6:
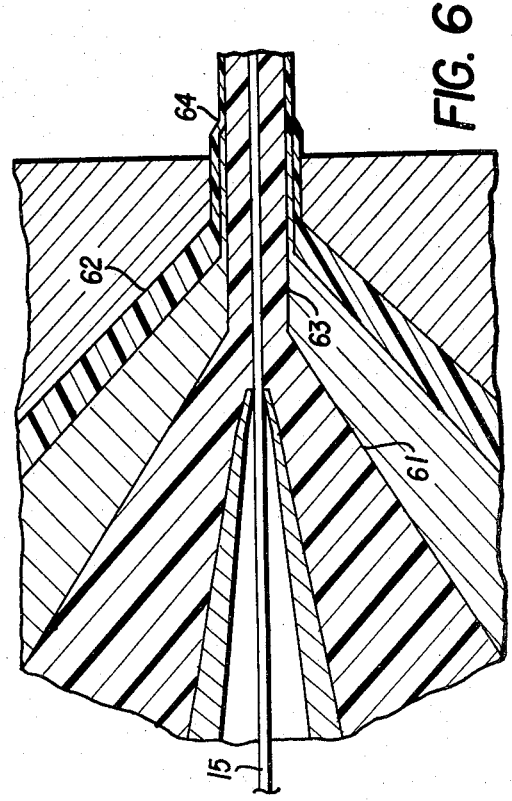
FIG. 6 is a cross-sectional view of the insulation and the insulation shielding as they are processed by the present invention.

Referring again to FIG. 1 and also to FIG. 6, when the antiprotrusion tip (13) is screwed into the extrusion head body (11) the antiprotrusion tip (13) is concentric to the longitudinal axis of the predetermined straight path of the conductor strand (15). Concentric alignment of the die (12) and the starter tip (14) is achieved by independent adjustment of a plurality of alignment bolts (16 and 17). Independent concentric adjustment of the die (12) and the starter tip (14) is desired to eliminate the continuing need to adjust the concentricity of cable being produced using prior art methods and apparatus, and is made possible as a result of the separating effect of the stationary antiprotrusion tip (13). The starter tip (14) receives shielded conductor strand (15) and guides it to the predetermined straight path. The space between the outer surface of the starter tip (14) and the inner surface of the antiprotrusion tip (13) is the area in which extruded insulation compound (61) from an extruder (not shown) is guided by extruder pressure to the shielded conductor strand (15) in a first extrusion plane. The small aperture of the antiprotrusion tip (13) molds the outer surface of the insulation (61) in the first extrusion plane. Between the outer surface of the antiprotrusion tip (13) and the inner surface of the die (12) insulation shielding compound (62) is forced at about 4,500 pounds per square inch extruder pressure by another extruder (not shown) toward the newly formed insulated cable (63). The die (12) aperture limits the outer circumference of the insulation shielding (64) while the tubular extension of the antiprotrusion tip (13) guides the insulation shielding compound (64) out past the die (12) and onto the newly molded cable insulation (63) in a second extrusion plane. When the insulation shielding compound (64) exits the die (12) the pressure is decreased from approximately 4,500 pounds per square inch to between 90 and 300 pounds per square inch for thermosetting insulated power cable, and to about one atmosphere for thermoplastic power cable. In the case of thermosetting insulated cable, 90 pounds per square inch is normally the minimum pressure because voids form in the insulating and shielding compounds at lower pressures while maximum pressure is limited only by the capability of supplementary pressure-related equipment which is usually no more than about 300 pounds per square inch. This decrease in pressure at which insulation shielding compound (64) is applied to the insulation (63) in the separate second extrusion plane prevents pressuring insulation shielding compound (64) particles such as carbon black into the insulation (63). Thus inward protrusion defects are eliminated.

Figure 7:
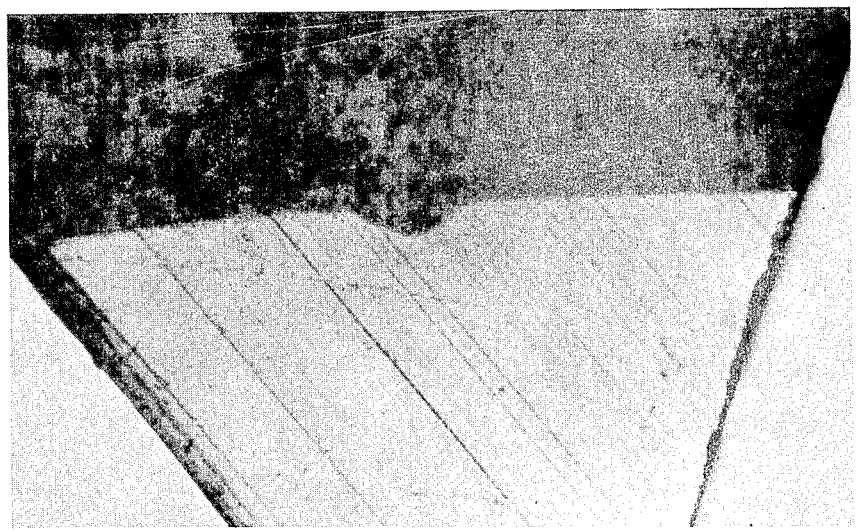
FIG. 7 is a photomicrograph of a cross-sectional portion of high voltage cable produced by prior art means taken at 32× magnification.

FIG. 7 is a cross-sectional photomicrograph of a portion of high voltage cable produced by prior art means illustrating protrusion of carbon black particles 5 mils into the primary insulation.

Figure 8:
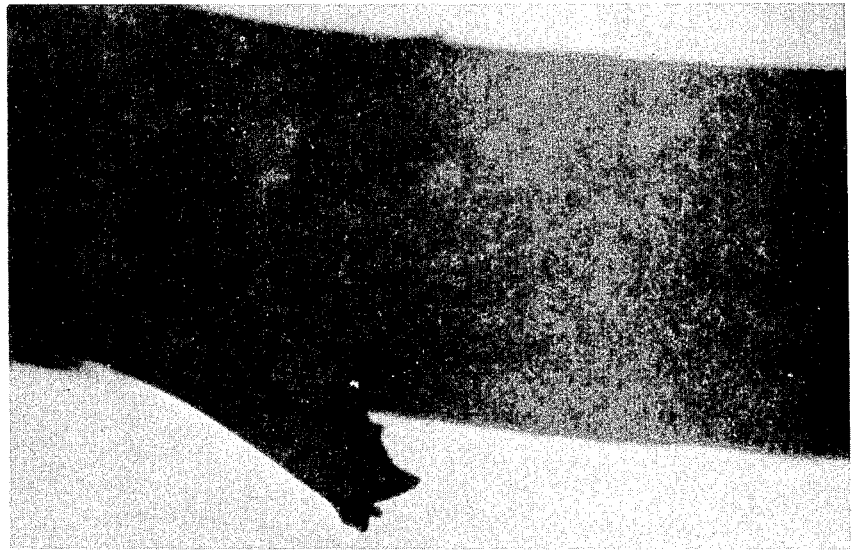
FIG. 8 is a photomicrograph of prior art insulation shield which has been stripped from the insulation taken at 40× magnification.

FIG. 8 is a photomicrograph of prior art insulation shield which has been stripped from the insulation, exposing a protrusion measuring 25 mils by 40 mils.

Figure 9:
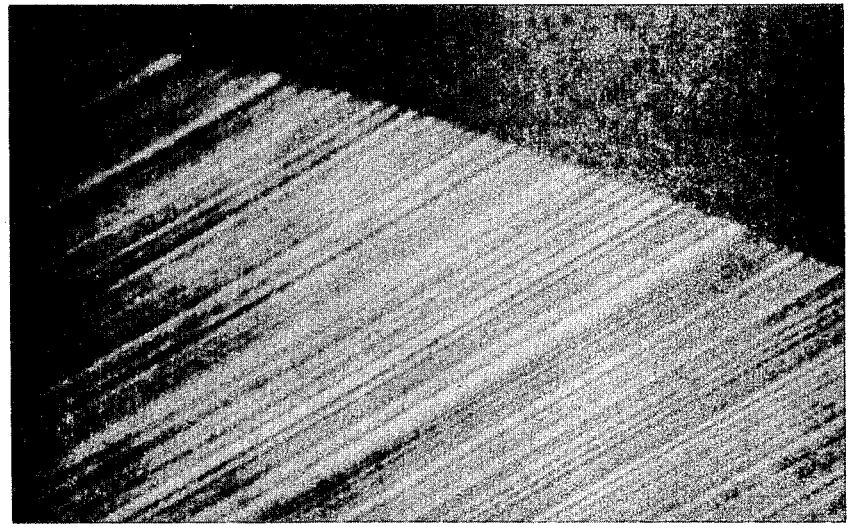
FIG. 9 is a photomicrograph of a cross-sectional portion of high voltage cable produced by the present invention taken at 40× magnification.

FIG. 9 is a photomicrograph of a cross-sectional portion of high voltage cable produced by the present invention wherein protrusions are vertually eliminated.

While this invention has been described in detail with particular references to preferred embodiments thereof, it will be understood that variations and modifications can be effective within the spirit and scope of the invention as described hereinbefore and as defined in the appended claims.

What I claim as the invention is:

1. An apparatus for extruding primary insulation and insulation shielding onto an advancing shielded conductor strand in one operation without causing inward protrusions of insulation shielding compound particles into the primary insulation comprising:

an extruder head housing means having a shielded conductor strand entrance, said extruder head including means for accepting primary insulation compound from a first extruder, means for accepting insulation shield compound from a second extruder, means for adjusting the concentricity of said shielded conductor strand, said primary insulation and said insulation shielding, and a cable exit;

an inner tip means mounted in said head housing and near said shield conductor entrance for accepting said advancing shielded conductor strand and guiding said shielded conductor strand along a predetermined straight path, said inner tip means also being adapted to guide the flow of primary insulation compound through said head housing and toward said shielded conductor strand;

an antiprotrusion tip means having an inner and outer surface mounted in said housing and in combination with said inner tip means, said antiprotrusion tip means partially surrounding said inner tip with the inner surface of said antiprotrusion tip thereby cooperating with said inner tip to guide said primary insulation compound toward and onto said shielded conductor strand in a first extrusion plane as said outer surface of said antiprotrusion tip smooth the primary insulation side surface of an insulation shielding compound and guides it toward the advancing shielded and insulated conductor, and having a tubular extension with an inner circumference equal to the expected circumference of the primary insulation and an outer circumference approximately equal to that of the finished product concentric to the longitudinal axis of said predetermined straight path and extending out from said extrusion head to define said cable exit and the point advanced in the direction of material flow from said first extrusion plane at which the smooth surface of the insulation shielding compound is applied in a second extrusion plane to the primary insulation surface of the advancing shielded conductor.

2. The apparatus of claim 1 wherein said cable exit comprises a die means, said die means including an inner extrusion surface and a die orifice, which is mounted in said head housing in such a relationship to said antiprotrusion tip means that an antiprotrusion tip extension projects through said die orifice and said die means surrounds said antiprotrusion tip and an insulation shield extrusion cavity is formed through which said insulation shield material is guided onto the primary insulation in said second extrusion plane at a point external of said die means and approximate to the outmost extension of the antiprotrusion tip.

3. An apparatus of claim 2 wherein said antiprotrusion tip extension and said die orifice are positioned with said extension passing through said die orifice and extending therebeyond to reduce insulation shielding compound pressure from normal extruder pressure of about 4,500 pounds per square inch to a relatively low insulation shielding compound pressure of from about 90 pounds per square inch to about 300 pounds per square inch for thermosetting compounds and about one atmosphere for thermoplastic compounds.

4. An apparatus of claim 1 wherein said means for adjusting the concentricity of said shielded conductor strand, said primary insulation and said insulation shielding comprises: means for independently securing said antiprotrusion tip to said extruder head housing means concentric to the longitudinal axis of a predetermined straight conductor strand path; means for independently adjusting the alignment of said inner tip concentric to said predetermined straight conductor path; and means for independently adjusting the alignment of said die means concentric to said antiprotrusion tip.

5. An apparatus of claim 4 wherein said means for independently adjusting concentricity comprises individual adjustment means separated by said stationary antiprotrusion tip to promote accurate concentric individual alignment of each cable component without affecting the concentricity of other components thereby substantially reducing the requirement to continuously make adjustments affecting said concentric individual alignment of each cable component.

6. An apparatus for the tandem concentric extrusion of primary insulation and insulation shielding onto an advancing shielded conductor strand in one operation without causing inward protrusions of insulation shielding compound particles into the primary insulation comprising:
means for advancing the shielded conductor strand along a predetermined straight path through an extruder head housing means comprising a starter tip;
means for extruding a primary insulation onto said advancing shielded conductor strand in a first extrusion plane; and
means including a die for simultaneously extruding an ironed insulation shield onto said advancing shielded conductor strand in a second extrusion plane at a point advanced in the direction of material flow from said first extrusion plane, said means comprising an antiprotrusion tip which causes undispersed particles projecting from said insulation side surface to be reabsorbed into the polymer matrix of said insulation shielding thereby preventing the piercing of said insulation by said particles.

7. The apparatus of claim 6 wherein said means for extruding a primary insulation onto said advancing shielded conductor strand in a first extrusion plane further comprises means for molding the outer surface of said primary insulation smoothly concentric to the longitudinal axis of said shielded conductor strand as said shielded conductor strand advances along said predetermined straight path to form a primary insulation.

8. The apparatus of claim 6 wherein said means for simultaneously extruding an ironed insulation shielding onto said advancing shielded and insulated conductor strand in a second extrusion plane further comprises means for molding the outer surfaces of said insulation shielding into smooth concentricity with the longitudinal axis of said shielded conductor strand as said shielded conductor strand advances along said predetermined straight path to form an insulation shield.

9. The apparatus of claim 6 wherein said apparatus for the tandem concentric extrusion of insulation and insulation shielding in separate planes further comprises:
means for independently securing said antiprotrusion tip concentric to about the longitudinal axis of the predetermined straight path of the conductor strand;
means for independently adjusting said starter tip into concentric alignment with said antiprotrusion tip and said predetermined straight path; and
means for independently adjusting said die into concentric alignment with said antiprotrusion tip and said predetermined straight path;
whereby said independent separate adjustment means promote accurate concentric individual alignment of each cable component without affecting the concentricity of other components.

10. The apparatus of claim 7 further comprising means for extruding said primary insulation onto said advancing shielded conductor strand in a first extrusion plane at a head pressure of about 4500 pounds per square inch.

11. The apparatus of claim 8 further comprising means for extruding said ironed insulation shielding onto said advancing shielded and insulated conductor at a tube pressure of from about 90 to about 300 pounds per square inch for thermosetting compounds and at a tube pressure of about one atmosphere for thermoplastic compounds.

12. A method for the tandem concentric extrusion of primary insulation and insulation shielding onto an advancing shielded conductor strand in one operation without causing inward protrusions of insulation shielding compound particles into the primary insulation comprising:
advancing the shielded conductor strand along a predetermined straight path through an extruder head housing means comprising a starter tip;
extruding, through a means including a die, a primary insulation onto said advancing shielded conductor strand in a first extrusion plane; and
simultaneously extruding an ironed insulation shield onto said advancing shielded conductor strand in a second extrusion plane at a point advanced in the direction of material flow from said first extrusion plane through use of an antiprotrusion tip which causes undispersed particles projecting from the insulation side surface of the insulation shield to be reabsorbed into the polymer matrix of said insulating shielding to prevent piercing of said insulation by said particles.

13. The method of claim 12 wherein said step of extruding a primary insulation onto said advancing shielded conductor strand in a first extrusion plane includes the additional step of molding the outer surface of said primary insulation smoothly concentric to the longitudinal axis of said shielded conductor strand as said shielded conductor strand advances along said predetermined straight path to form a primary insulation.

14. The method of claim 12 wherein said step of extruding an ironed insulation shielding onto said advancing shielded and insulated conductor strand in a second extrusison plane includes the step of molding the outer surfaces of said insulation shielding into smooth concentricity with the longitudinal axis of said shielded conductor strand as said shielded conductor strand advances along said predetermined straight path to form an insulation shield.

15. The method of claim 12 wherein said tandem concentric extrusion of insulation and insulation shielding in separate planes further comprises:
  independently securing said antiprotrusion tip concentric to about the longitudinal axis of the predetermined straight path of the conductor strand;
  independently adjusting said starter tip into concentric alignment with said antiprotrusion tip and said predetermined straight path; and
  independently adjusting said die into concentric alignment with said antiprotrusion tip and said predetermined straight path;
  whereby said independent separate adjustments promote accurate concentric individual alignment of each cable component without affecting the concentricity of other components.

16. The method of claim 13 including the step of extruding said primary insulation onto said advancing shielded conductor strand in a first extrusion is carried out at a head pressure of about 4500 pounds per square inch.

17. The method of claim 14 including the step of extruding said ironed insulation shielding onto said advancing shielded and insulated conductor is carried out at a tube pressure of from about 90 to about 300 pounds per square inch for thermosetting compounds and a tube pressure of about one atmosphere for thermoplastic compounds.

18. Improved cross-linked polyethylene insulated power cables rated 5 through 35 KV manufactured by the process of claim 12.

19. Improved thermoplastic polyethylene insulated power cables rated 5 through 35 KV manufactured by the process of claim 12.

* * * * *